(12) United States Patent
Hwang et al.

(10) Patent No.: US 11,193,319 B2
(45) Date of Patent: Dec. 7, 2021

(54) BUMPER STRIP FOR VEHICLE AND MANUFACTURING METHOD THEREOF

(71) Applicants:Hyundai Motor Company, Seoul (KR); Kia Motors Corporation, Seoul (KR); Creative Automotive Module System Co., Ltd., Gwangju (KR)

(72) Inventors: Hyun-Seung Hwang, Hwaseong-si (KR); Tae-Woong Cho, Hwaseong-si (KR); Eun-Soo Park, Seoul (KR); Seung-Yoon Roh, Suwon-si (KR); Seung-Mok Lee, Osan-si (KR); Kyung-Tak Park, Gwangju (KR)

(73) Assignees: Hyundai Motor Company, Seoul (KR); Kia Motors Corporation, Seoul (KR); Creative Automotive Module System Co., Ltd., Gwangju (KR)

( * ) Notice: Subject to any disclaimer, the term of this patent is extended or adjusted under 35 U.S.C. 154(b) by 362 days.

(21) Appl. No.: 16/213,689

(22) Filed: Dec. 7, 2018

(65) Prior Publication Data

US 2019/0316402 A1  Oct. 17, 2019

(30) Foreign Application Priority Data

Apr. 11, 2018  (KR) .......................... 10-2018-0042160

(51) Int. Cl.
*E05F 5/02* (2006.01)
*B29C 45/14* (2006.01)
(Continued)

(52) U.S. Cl.
CPC .............. *E05F 5/022* (2013.01); *B29C 45/14* (2013.01); *B29C 45/14336* (2013.01);
(Continued)

(58) Field of Classification Search
CPC ......... B60R 19/24; B60R 19/42; B60R 19/44; B60R 19/445; B60R 2019/1886; B29L 2031/3044; B62D 21/152
(Continued)

(56) References Cited

U.S. PATENT DOCUMENTS

2018/0178847 A1\* 6/2018 Jeong .................. B29C 45/1704

FOREIGN PATENT DOCUMENTS

| KR | 10-0693630 B1 | 3/2007 |
| KR | 101491125 B1 \* | 2/2015 |

OTHER PUBLICATIONS

Shin, "A Device For Mounting A Bumper Strip Of Vehicles", Feb. 11, 2015, Korean Intellectual Property Office (Year: 2015).\*

\* cited by examiner

*Primary Examiner* — Dennis H Pedder
*Assistant Examiner* — Joyce Eileen Hill
(74) *Attorney, Agent, or Firm* — Morgan, Lewis & Bockius LLP

(57) ABSTRACT

A bumper strip for a vehicle may include an upper surface portion forming an upper surface, a rear surface portion downwardly extending from the rear end portion of the upper surface portion and accommodated on a hood seating portion of the bumper, a matching portion cover of a shape extending in the rearward and downward directions from the rear surface portion, and a side surface portion forming a side surface, and wherein the upper surface portion, the rear surface portion, the matching portion cover and the side surface portion are integrally formed.

9 Claims, 10 Drawing Sheets

(51) Int. Cl.
    *B29C 45/16*          (2006.01)
    *B60R 19/48*          (2006.01)
    *B60R 19/24*          (2006.01)
    *B29C 45/33*          (2006.01)
    *B29L 31/30*          (2006.01)

(52) U.S. Cl.
    CPC .......... *B29C 45/1635* (2013.01); *B60R 19/24*
        (2013.01); *B60R 19/48* (2013.01); *B29C 45/33*
        (2013.01); *B29L 2031/3044* (2013.01); *E05Y*
        *2201/212* (2013.01); *E05Y 2600/53* (2013.01);
           *E05Y 2800/46* (2013.01); *E05Y 2900/536*
                                        (2013.01)

(58) Field of Classification Search
    USPC ................ 293/108, 121, 128, 142, 154, 155
    See application file for complete search history.

BUMPER STRIP FOR VEHICLE AND MANUFACTURING METHOD THEREOF

CROSS-REFERENCE TO RELATED APPLICATION

The present application claims priority to Korean Patent Application No. 10-2018-0042160 filed on Apr. 11, 2018, the entire contents of which is incorporated herein for all purposes by this reference.

BACKGROUND OF THE DISCLOSURE

Field of the Disclosure

The present invention relates to a bumper strip mounted on a bumper for a vehicle and a manufacturing method thereof.

Description of Related Art

Generally, a hood of a vehicle serves to cover an engine compartment and coupled to a vehicle body to be opened or closed through a hinge, and the end portion thereof is disposed adjacent to a bumper.

Since the hood is hinged to the body and the end portion adjacent to the bumper is turned to open or close the engine compartment, the front end portion of the hood and the bumper are provided in a separated state, forming a gap between the hood and the bumper.

The external contaminant material flows into the gap between the hood and the bumper to cause problems such as corrosion of the engine compartment and the appearance deterioration. Also, since the marking impact may occur when the hood is closed, so a bumper strip is provided to close the gap between the hood and the bumper.

FIG. 1 and FIG. 2 show a typical bumper strip.

The bumper strip is fabricated by machining a plurality of assemble holes 2 on the main strip 1 of the extruded rubber with a cross-sectional structure for absorbing impact and assembling clips 3 on the assemble holes 2.

As such, the end portion of the main strip 1 is cut, and a strip end portion 4, which is separately manufactured by injection-type rubber, is fused and assembled.

In other words, due to the complicated structure and complexity of the production process by assembling the clip and fusing the end portion, material costs are increased due to the application of a plurality of clips, resulting in molding cost and welding cost of the injection molding.

Furthermore, even if an injection-molding strip is to be implemented, a certain repulsive force is secured in the structure, and appearance bending occurs.

That is, it is difficult to obtain a certain compressive repulsive force when the hood is closed, and when the rib shape is applied for rigidity, and the like, quality problems such as appearance bending and sink mark occur.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a bumper strip for a vehicle and a manufacturing method thereof that can simplify complex and unnecessary production processes by eliminating complicated assemble structures.

A bumper strip for a vehicle according to an exemplary embodiment of the present invention may include, an upper surface portion forming an upper surface; a rear surface portion downwardly extending from the rear end portion of the upper surface portion and accommodated on a hood seating portion of the bumper; a matching portion cover of a shape extending in the rearward and downward directions from the rear surface portion; and a side surface portion forming a side surface; and wherein the upper surface portion, the rear surface portion, the matching portion cover and the side surface portion are integrally formed.

Furthermore, a hook supporting portion of a shape extending from the front end portion of the upper surface portion to the rear surface portion may be further included partially; and the hook supporting portion may be integrally formed with the upper surface portion and the rear surface portion.

Herein, the hook supporting portion may have a shape corresponding to the shape of the hook seating portion.

Furthermore, an assemble hook of a shape of downwardly extending from the lower surface of the hook supporting portion and an assemble guide of a shape of downwardly extending from the lower end portion of the assemble hook may further be included, the assemble hook and the assemble guide may be integrally formed with the hook supporting portion.

Next, a manufacturing method of a bumper strip according to an exemplary embodiment of the present invention, may include injection-molding the shape of the bumper strip, which is configured to include an upper surface portion forming an upper surface, a rear surface portion downwardly extending from the rear end portion of the upper surface portion and accommodated on a hood seating portion of the bumper, a matching portion cover of a shape extending in the rearward and downward directions from the rear surface portion, a side surface portion forming a side surface, and a hook supporting portion of a shape of partially extending from the front end portion of the upper surface portion to the rear surface portion, with a rubber material to be integrally formed; injecting the side surface portion and the hook supporting portion by inserting a slide core of a shape corresponding to the shapes of the side surface portion and the hook supporting portion into a mold.

Furthermore, in a manufacturing method of bumper strip according to various exemplary embodiments of the present invention, the bumper strip, which is configured to include an upper surface portion forming an upper surface, a rear surface portion downwardly extending from the rear end portion of the upper surface portion and accommodated on a hood seating portion of the bumper, a matching portion cover of a shape extending in the rearward and downward directions from the rear surface portion, a side surface portion forming a side surface, a hook supporting portion of a shape of partially extending from the front end portion of the upper surface portion to the rear surface portion, and a bumper inserting portion of a shape of downwardly extending from the lower surface of the hook supporting portion, may be inserted into a hood seating portion of the bumper to integrally insert-inject with the bumper.

According to a bumper strip for a vehicle and a manufacturing method of the present invention, it is possible to reduce the material cost by deleting the clip and integrating an end portion shape using the integral injection structure.

Furthermore, the manufacturing process may be simplified by greatly reducing the production process compared to the convention art.

Nevertheless, it is possible to solve the quality problem by ensuring constant repulsive force on the injection strip structure and eliminating appearance bending.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
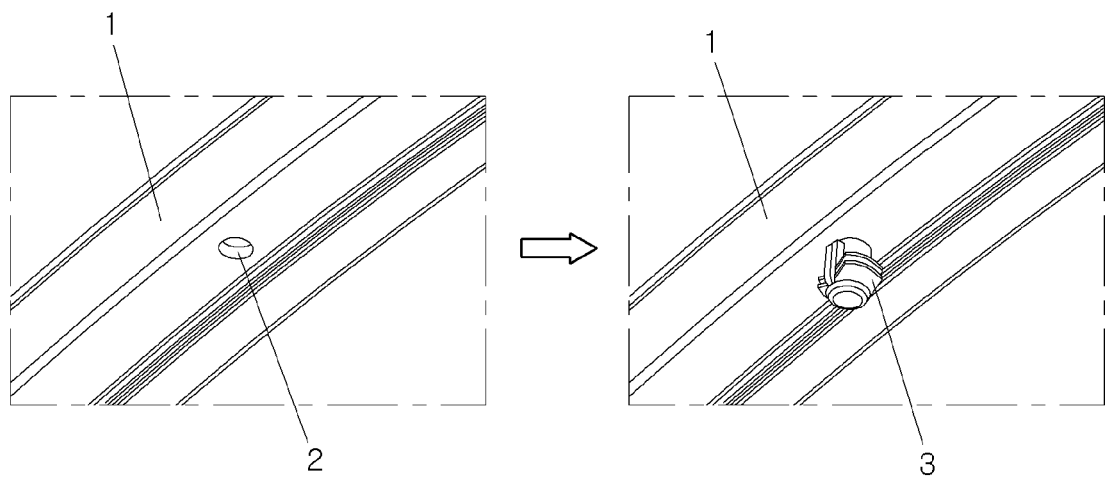
FIG. 1 and FIG. 2 show a manufacturing process of a conventional bumper strip.
Figure 2:
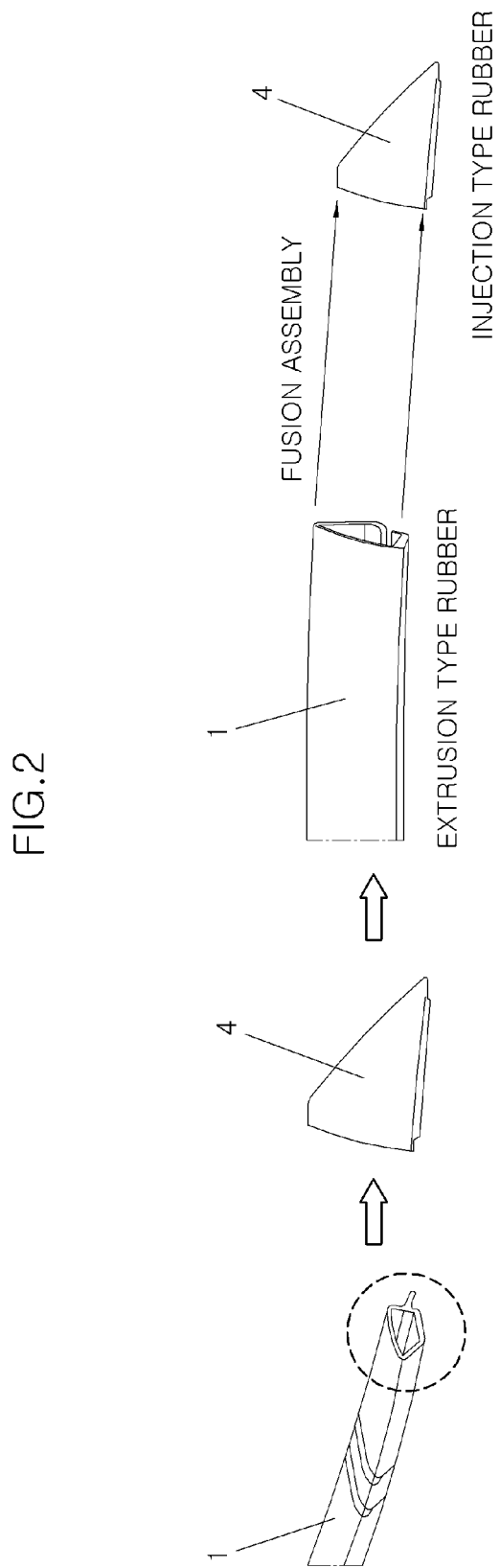

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

To fully understand the present invention, the operational advantages of the present invention, and the objects attained by the practice of the present invention, reference may be made to the appended drawings illustrating the exemplary embodiments of the disclosure and the description in the accompanying drawings.

In describing an exemplary embodiment of the present invention, known techniques or repetitive descriptions which may unnecessarily obscure the essence of the present invention would either reduce or omit the description thereof.

Figure 3:
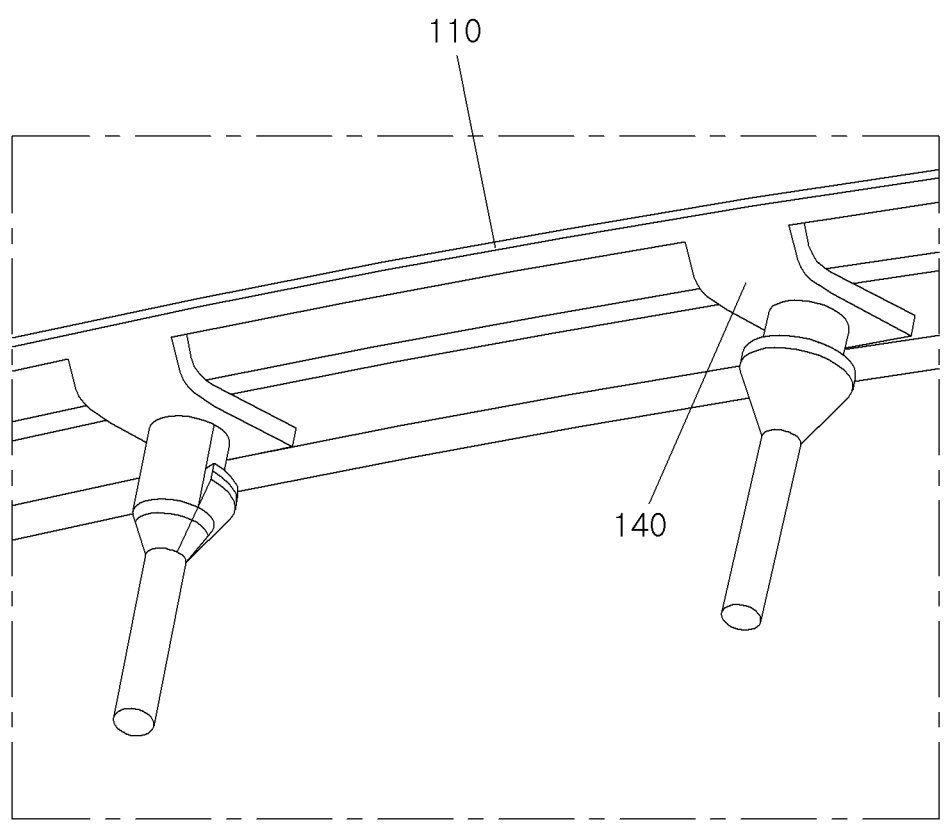
FIG. 3 and FIG. 4 show a portion of the bumper strip by an exemplary embodiment of the present invention.
Figure 4:
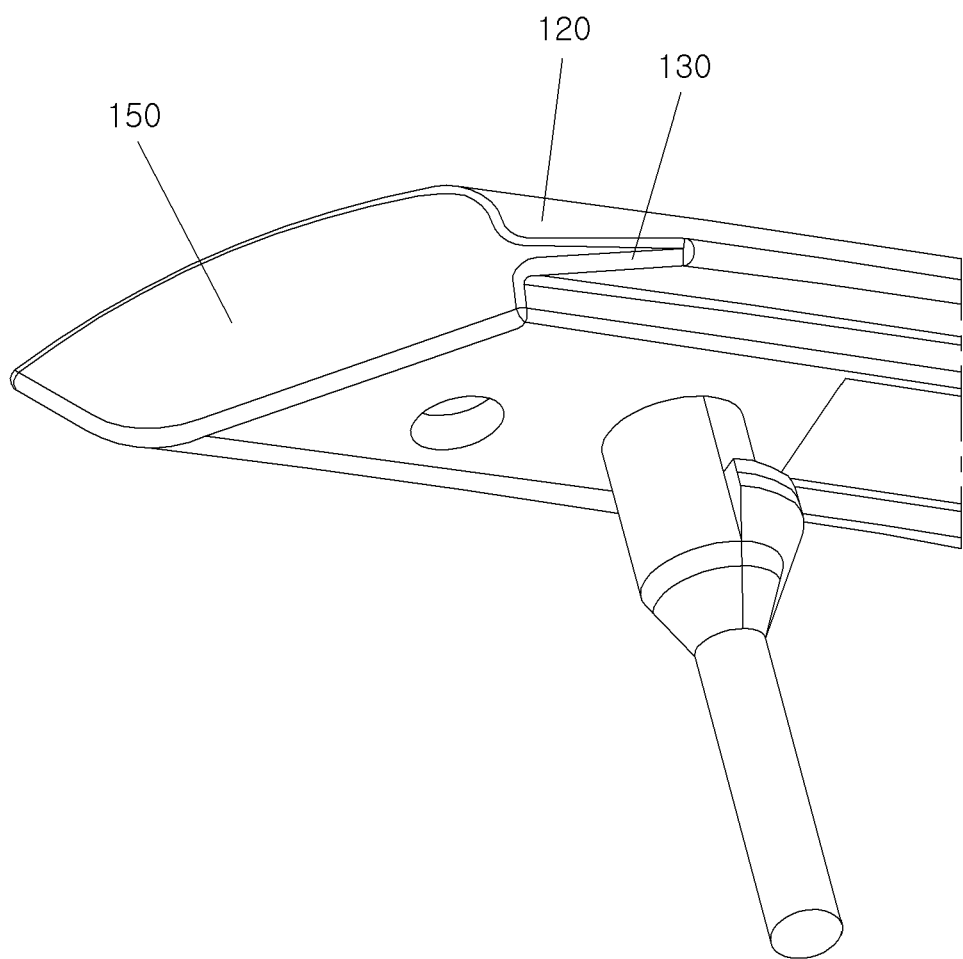
Figure 5:
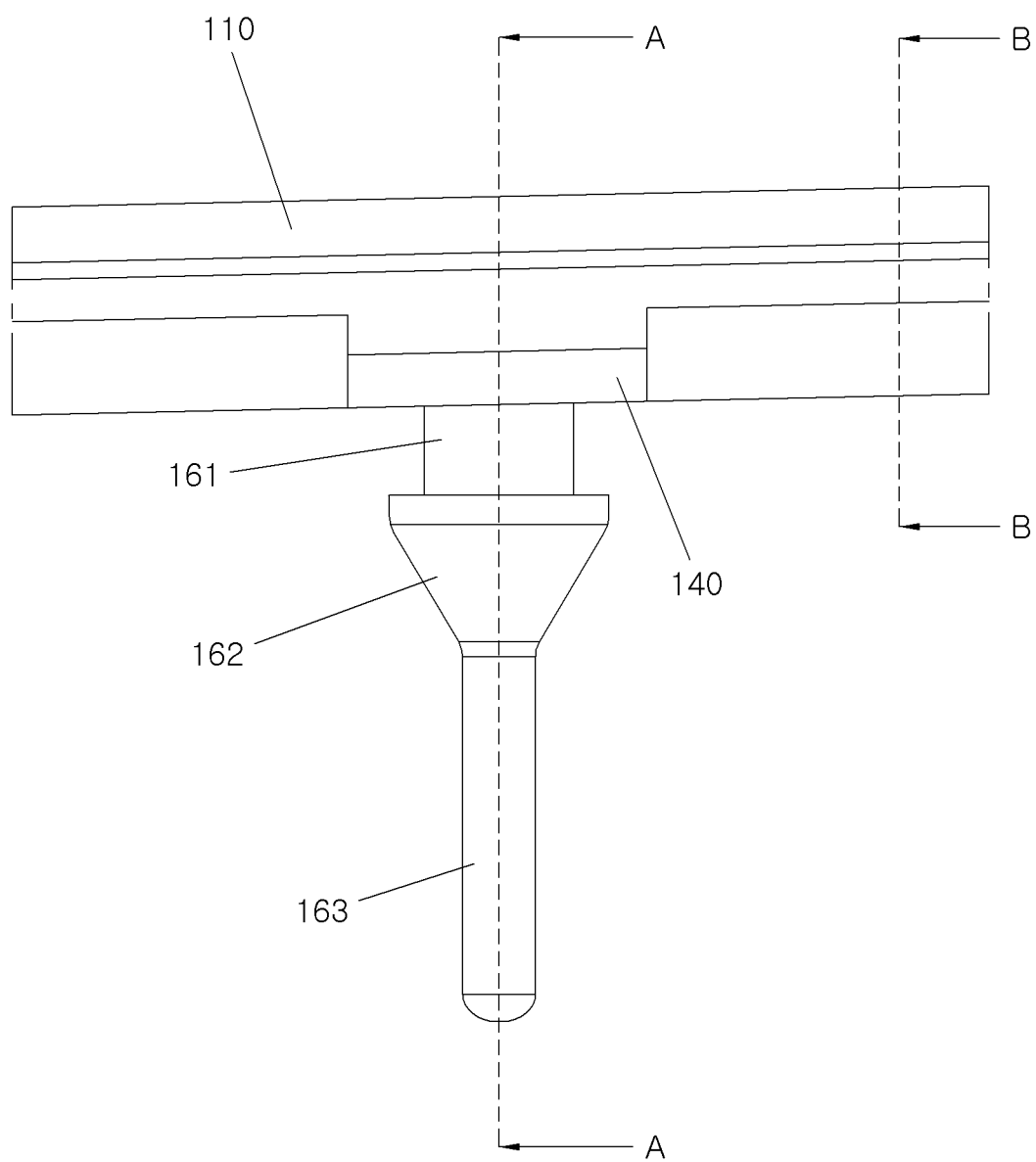
FIG. 5 shows a portion of the frontal shape of the bumper strip by the exemplary embodiment of the present invention.

FIG. 3 and FIG. 4 show a portion of the bumper strip by an exemplary embodiment of the present invention; and FIG. 5 shows a portion of the frontal shape of the bumper strip by the exemplary embodiment of the present invention.

Hereinafter, referring to FIG. 3 to FIG. 5, a bumper strip according to an exemplary embodiment of the present invention will be described.

The bumper strip for the vehicle as an exemplary embodiment of the present invention is to be mounted on a bumper 10 of the vehicle to fill the gap between the bumper 10 and a hood 20, and to prevent being stabbed by impact when the hood 20 is closed.

The bumper strip may include an upper surface portion 110 exposed from the upper end portion of the bumper 10 to form an upper surface, a rear surface portion 120 accommodated on a hood seating portion 11 of the bumper 10 to downwardly extend from the rear end portion of the upper surface portion 110, a matching portion cover 130 of a shape of extending in the rearward and downward directions from the rear surface portion 120, and side surface portions 150 forming both sides surfaces.

Herein, the direction of the upper, lower, and back sides corresponds to the direction based on the front of the vehicle.

Since these parts of the bumper strip are integrally formed by the injection type rubber and should correspond to the end portion shape of bumper 10, the bumper strip has a curved shape with the center being higher than the side and is formed in a shape curved to the rear of the vehicle from the center toward the side thereof.

Figure 6:
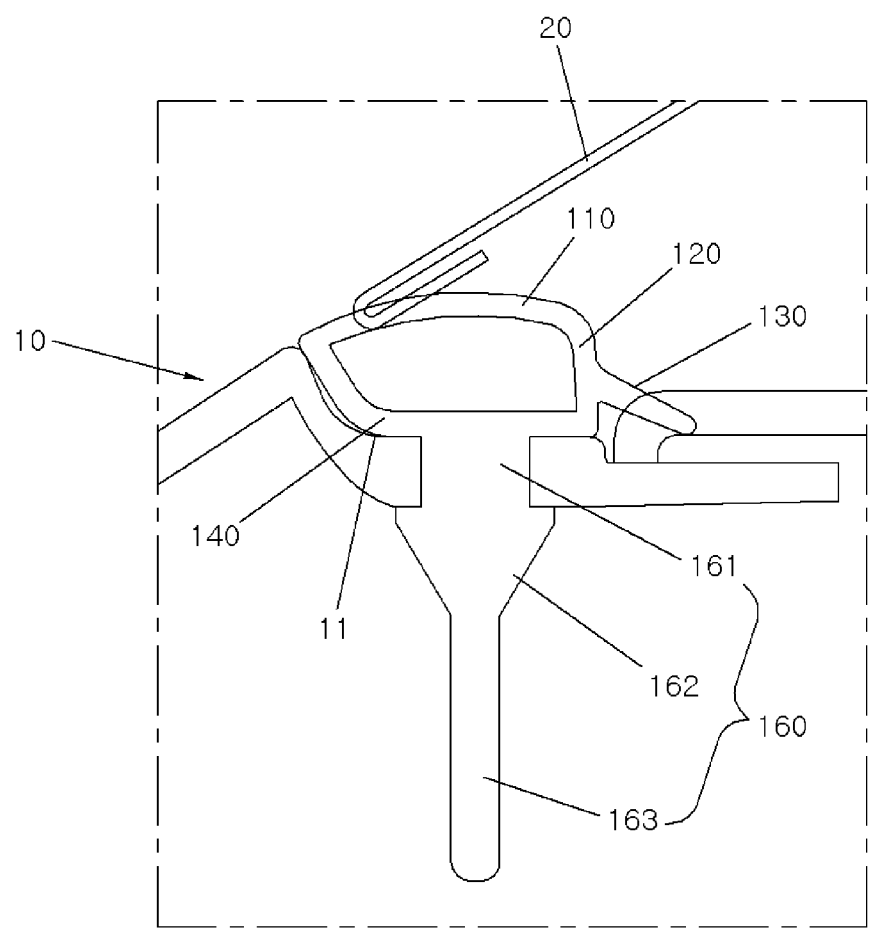
FIG. 6 shows a cross-sectional view taken along line A-A in FIG. 5.

Furthermore, for joining to bumper 10, a hook supporting portion 140 may be formed as referenced in FIG. 5 and FIG. 6.

The hook supporting portion 140 may be a portion that is seated in contact with the hood seating portion 11 of the bumper 10.

The hood seating portion 11 may be rounded from the upper end portion of the bumper 10 in the downward and rearward directions, and then extends in a flat shape.

The hook supporting portion 140 may be rounded in the downward and reward directions from the front end portion of the upper surface portion 110 to correspond to the curved surface of the hood seating portion 11 to correspond to the shape of the hood seating portion 11, and then extending to the rear surface portion 120 to have a flat shape to form a closed cross-section.

Figure 7:
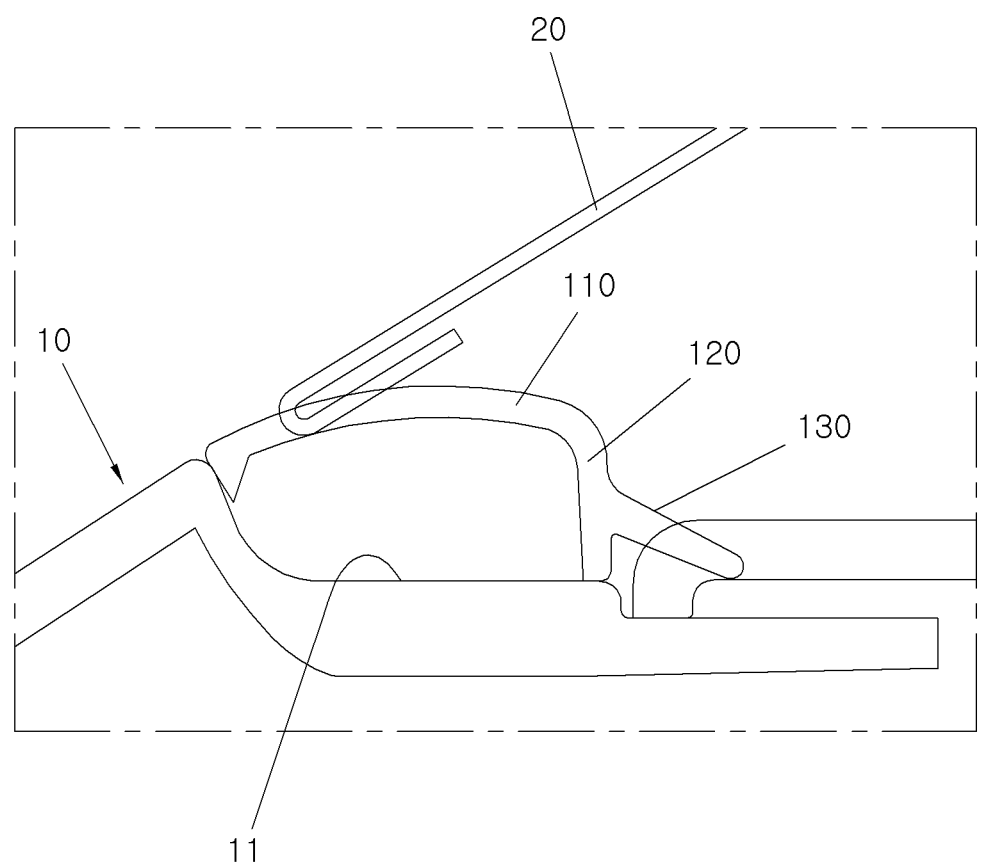
FIG. 7 shows a cross-sectional view taken along line B-B in FIG. 5.

The hook supporting portion 140 may be for a hook accommodated and assembled in the hood seating portion 11, so it is formed only as a partial according to the number of assemble hooks. As shown in FIG. 7, the portion where the hook supporting portion 140 is not formed does not form the closed cross-section.

Furthermore, an assemble hook 160 downwardly extending from the lower surface of the hook supporting portion 140 is formed and inserted into a hook insertion hole formed in the hood seating portion 11.

The assemble hook 160 may include a penetrating portion 161 passing through the hook insertion hole and a hanging portion 162 having a diameter larger than the diameter of the penetrating portion 161 and decreasing in a diameter toward the lower portion thereof, and an assemble guide 163 is extended from the hanging portion 162.

The assemble guide 163 may have a diameter smaller than the diameter of the penetrating portion 161 and is configured to easily insert into the hook insertion hole.

The hanging portion 162 is inserted into the bumper by the shape to prevent the assemble hook 160 inserted into and assembled to the bumper from being separated to the upper side thereof.

In an exemplary embodiment of the present invention, the hanging portion 162 is in a shape of cone.

In an exemplary embodiment of the present invention, the hanging portion 162 is partially formed on an external surface of the penetrating portion 161, as shown in FIG. 4

Since the hook supporting portion 140, the assemble hook 160 and the assemble guide 163 are integrally formed by the injection type rubber, the conventional clip assemble and the fusion process of the end portion become unnecessary.

Furthermore, as shown in FIG. 4, the side surface portions 150 also may have a bottom surface shape such as the hook supporting portion 140 for assemble workability and coupling strength, and the assemble hook 160 and assemble guide 163 can also be formed on the bottom surface of these side surface portions 150.

Figure 8:
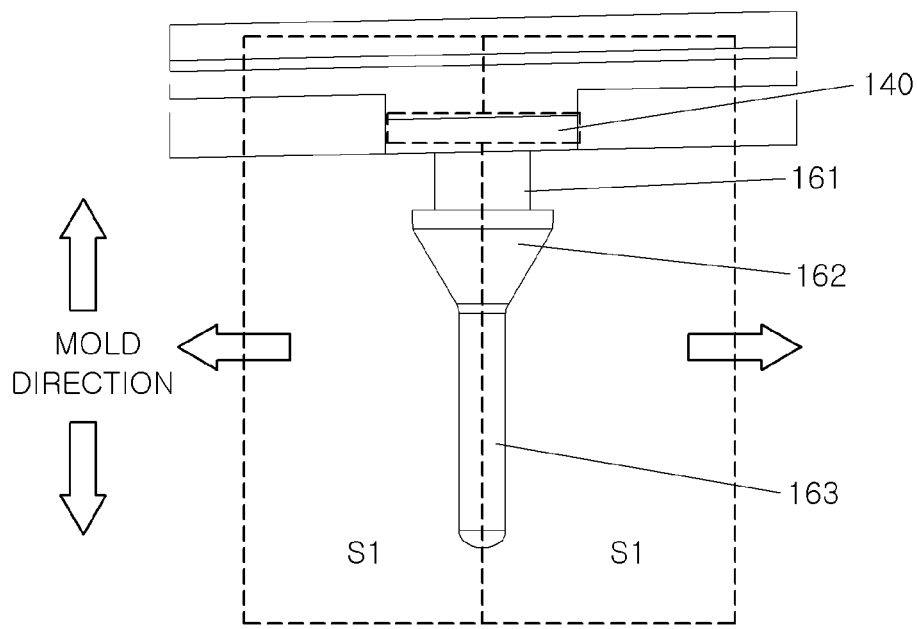
FIG. 8 and FIG. 9 show the manufacturing method of the bumper strip as an exemplary embodiment of the present invention.
Figure 9:
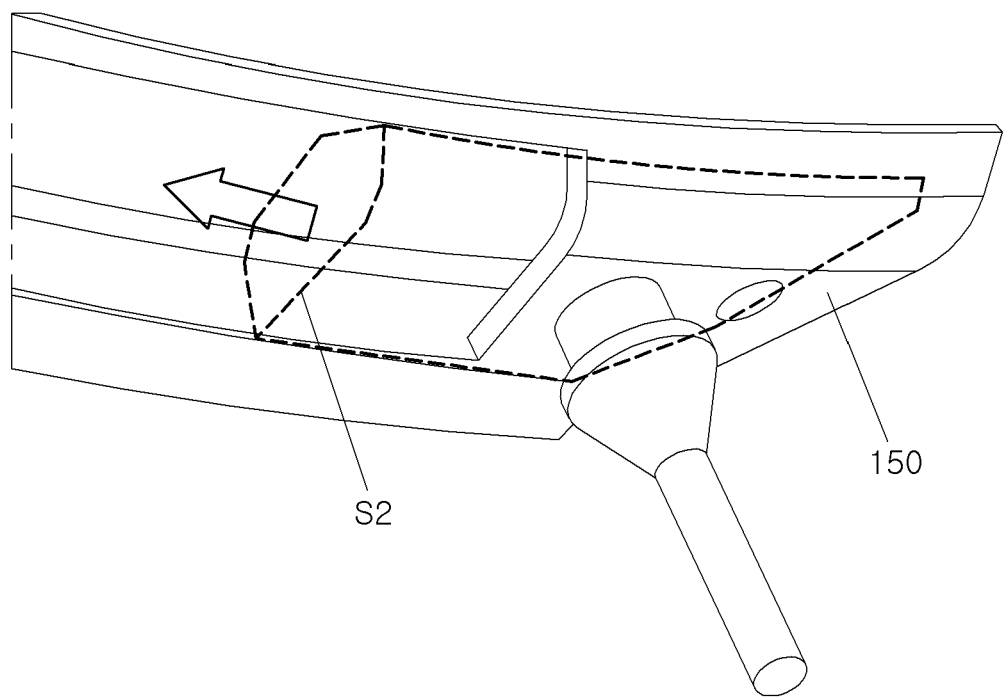

FIG. 8 and FIG. 9 show the manufacturing method of the bumper strip according to an exemplary embodiment of the present invention. Referring to these drawings, the manufacturing method of the bumper strip as an exemplary embodiment of the present invention will be described.

A manufacturing method by an exemplary embodiment of the present invention is to integrally injection-mold the bumper strip having the upper surface portion, rear surface portion, matching portion cover, hook supporting portion, and side surface portions described above with rubber material, and the description of the configuration for general injection molding will be omitted here.

The manufacturing method the present invention differs from the conventional manufacturing method of forming the main strip by extruded rubber and manually assembling the assemble means and fusing the end portions.

Therefore, it is possible to omit the additional processing of the assemble means such as hooks or the process of additional welding, reducing the material cost and simplifying the process.

An upper mold and a lower mold corresponding to the shape of the upper surface portion, the rear surface portion, the matching portion cover, the hook supporting portion, and the side surface portions are manufactured, and the upper mold and the lower mold are assembled and rubber resin is injected to manufacture the bumper strip shape.

Furthermore, after assembling the mold for the shape of the hook supporting portion, assemble hook, assemble guide and side surface portions formed on the bottom surface, the injection is proceeded by inserting a slide core S1.

The slide core S1 of FIG. 8 is a slide core S1 having a core shape matching the shape of the hook supporting portion 140, the assemble hook 160 including the penetrating portion 161 and the hanging portion 162, and the assemble guide 163.

Furthermore, the slide core S2 of FIG. 9 has a core shape matching the shape of the assemble hook 160 and assemble guide formed at the lower end portion of the side surface portions 150 and the side surface portions 150.

Thus, the bumper strip manufacturing method of the present invention makes it possible to simplify the process and saving the material cost by integrally forming the shape of the bumper strip by the injection rubber.

Figure 10:
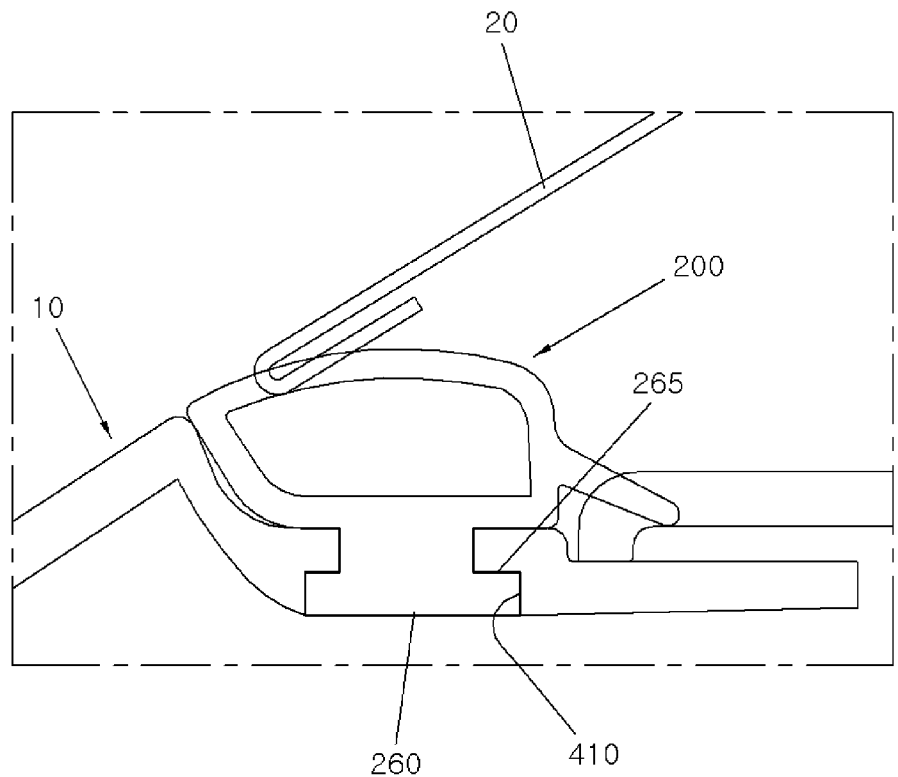
FIG. 10 shows a cross-sectional shape of the bumper strip by another exemplary embodiment of the present invention.

Additionally, FIG. 10 shows the cross-sectional shape of the bumper strip by another exemplary embodiment of the present invention.

The bumper strip 200 by another exemplary embodiment of FIG. 10 differs from the preceding exemplary embodiment only in assemble means such as an assemble hook.

The difference in shape is as shown, and the difference in manufacturing is that the shape of bumper strip 200 is formed by insert injection in manufacturing bumper 10.

Accordingly, the shape of the assemble guide for the assemble is not required, and the shape of the bumper inserting portion 260 only needs a shape of a flange 265 having a protruding circumference to prevent the bumper strip from being detached after manufacturing, so that the lower portion may be implemented as a radially extending shape than the upper portion.

In an exemplary embodiment of the present invention, the hood seating portion 11 of the bumper 10 may include a groove 410 to which the flange 265 of the bumper inserting portion 260 may be seated therein.

In an exemplary embodiment of the present invention, the flange 265 of the bumper inserting portion 260 may be made of elastic material such as rubber.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A bumper strip for a vehicle, the bumper strip comprising:
   an upper surface portion forming an upper surface of the bumper strip;
   a rear surface portion downwardly extending from a rear end portion of the upper surface portion, wherein the rear surface portion is configured to be accommodated on a hood seating portion of a bumper;
   a matching portion cover extending in rearward and downward directions from the rear surface portion;
   a side surface portion forming a side surface of the bumper strip; and
   a hook supporting portion for accommodating an assemble hook to be coupled to the hood seating portion,
   wherein the hook supporting portion is formed in plural according to a number of the assemble hook and the respective hook supporting portions are spaced apart from each other,
   wherein the assemble hook includes an assemble guide integrally extending in a predetermined length from a lower surface of the hook supporting portion so as to be easily inserted into a hole formed in the bumper, and wherein the upper surface portion, the rear surface portion, the matching portion cover and the side surface portion, and the hook supporting portion are integrally formed in one piece.

2. The bumper strip for the vehicle of claim 1, wherein the hook supporting portion extends from a front end portion of the upper surface portion to the rear surface portion in the bumper strip, and wherein the hook supporting portion is configured to form a closed cross-section with the upper surface portion and the rear surface portion.

3. The bumper strip for the vehicle of claim 2, wherein the hook supporting portion has a shape corresponding to a shape of the hook seating portion of the bumper.

4. The bumper strip for the vehicle of claim 2, wherein the assemble hook downwardly extends from a lower surface of the hook supporting portion; and wherein the assemble hook and the assemble guide are integrally formed with the hook supporting portion.

5. The bumper strip for the vehicle of claim 4, wherein the assemble hook further includes:

a penetrating portion configured for passing through a hook insertion hole of the hood seating portion; and a hanging portion extending from the penetrating portion and having a diameter larger than a diameter of the penetrating portion and decreasing in a diameter toward a lower portion thereof, wherein the assemble guide protrudes from the hanging portion.

6. The bumper strip for the vehicle of claim 5, wherein a diameter of the assemble guide is smaller than the diameter of the penetrating portion.

7. The bumper strip for the vehicle of claim 5, wherein the hanging portion is formed in a shape of a cone.

8. The bumper strip for the vehicle of claim 7, wherein the hanging portion is partially formed on an external surface of the penetrating portion.

9. The bumper strip for the vehicle of claim 2, further including:

a bumper inserting portion downwardly extending from a lower surface of the hook supporting portion and having a flange, wherein the flange of the bumper inserting portion is configured to be inserted into a groove of the hood seating portion of the bumper.

\* \* \* \* \*